United States Patent
Kumar et al.

(10) Patent No.: US 10,298,491 B2
(45) Date of Patent: May 21, 2019

(54) EFFICIENT PATH DETECTION AND VALIDATION BETWEEN ENDPOINTS IN LARGE DATACENTERS

(71) Applicant: Cisco Technology, Inc., San Jose, CA (US)

(72) Inventors: Deepak Kumar, San Ramon, CA (US); Yi Yang, Cary, NC (US); Carlos M. Pignataro, Raleigh, NC (US); Nagendra Kumar Nainar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 170 days.

(21) Appl. No.: 15/247,077

(22) Filed: Aug. 25, 2016

(65) Prior Publication Data

US 2018/0062990 A1     Mar. 1, 2018

(51) Int. Cl.
*H04L 12/28* (2006.01)
*H04L 12/721* (2013.01)
*H04L 12/751* (2013.01)
*H04L 12/709* (2013.01)

(52) U.S. Cl.
CPC .............. *H04L 45/70* (2013.01); *H04L 45/26* (2013.01); *H04L 45/02* (2013.01); *H04L 45/245* (2013.01)

(58) Field of Classification Search
CPC ..... H04L 45/70; H04L 12/4541; H04L 45/02; H04L 45/245; H04L 45/26
See application file for complete search history.

(56) References Cited

U.S. PATENT DOCUMENTS

| | | | | |
|---|---|---|---|---|
| 5,867,664 A | * | 2/1999 | Kosugi | G06F 15/17 710/56 |
| 6,385,649 B1 | * | 5/2002 | Draves | H04L 45/02 370/392 |
| 6,744,775 B1 | * | 6/2004 | Beshai | H04L 45/02 370/395.31 |

(Continued)

OTHER PUBLICATIONS

K. Kompella et al., "Detecting Multi-Protocol Label Switched (MPLS) Data Plane Failures", RFC 4379, Network Working Group, Feb. 2006, 50 pages.

(Continued)

*Primary Examiner* — Stephen M D Agosta
(74) *Attorney, Agent, or Firm* — Edell, Shapiro & Finnan, LLC

(57) ABSTRACT

In response to a path monitoring task for a particular source/destination pair, a network controller determines whether stored information includes paths for the particular source/destination pair. When the stored information includes paths for the particular source/destination pair, a subset of source ports is selected that covers all the paths for the particular source/destination pair. A probe message is sent to cause an ingress switch to send probe packets using the subset of source ports. Paths for the particular source/destination pair are computed based on received probe packets. A determination is made whether a topology for the data center network has changed by comparing the paths computed based on the receive probe packets for the particular source/destination pair with the paths included in the stored information for the particular source/destination pair.

20 Claims, 6 Drawing Sheets

(56) References Cited

U.S. PATENT DOCUMENTS

| | | | |
|---|---|---|---|
| 7,554,983 B1* | 6/2009 | Muppala | H04L 41/0896 370/392 |
| 9,015,309 B2 | 4/2015 | Duxbury et al. | |
| 9,154,440 B2 | 10/2015 | Zhou et al. | |
| 9,203,716 B2* | 12/2015 | Wei | H04L 43/0823 |
| 9,369,360 B1 | 6/2016 | Segalov et al. | |
| 2003/0065944 A1* | 4/2003 | Mao | H04L 63/02 726/25 |
| 2004/0048613 A1* | 3/2004 | Sayers | H04L 63/0407 455/426.2 |
| 2005/0099964 A1* | 5/2005 | Delaney | H04Q 3/0025 370/254 |
| 2007/0097892 A1* | 5/2007 | Tsang | H04L 45/26 370/310 |
| 2008/0049621 A1* | 2/2008 | McGuire | H04L 12/6418 370/236.2 |
| 2008/0072037 A1* | 3/2008 | Narayanan | H04L 9/3215 713/156 |
| 2011/0085472 A1* | 4/2011 | Somasundaram | H04L 45/00 370/254 |
| 2011/0267952 A1* | 11/2011 | Ko | H04L 43/0864 370/237 |
| 2013/0346470 A1* | 12/2013 | Obstfeld | G06F 9/5044 709/202 |
| 2014/0119231 A1 | 5/2014 | Chan et al. | |
| 2014/0126387 A1* | 5/2014 | Gintis | H04L 43/045 370/252 |
| 2014/0149819 A1* | 5/2014 | Lu | H04L 45/021 714/748 |
| 2014/0192677 A1* | 7/2014 | Chew | H04L 69/14 370/254 |
| 2015/0146531 A1* | 5/2015 | Welin | H04L 47/36 370/235 |
| 2015/0163100 A1* | 6/2015 | Graf | H04L 41/12 370/255 |
| 2016/0226774 A1* | 8/2016 | Farmanbar | H04L 47/24 |
| 2016/0269245 A1* | 9/2016 | Barnes | H04L 41/12 |

OTHER PUBLICATIONS

J. Pang et al., "Path Detection in VXLAN Overlay Network draft-pang-nvo3-vxlan-path-detection-00", Network Working Group, Internet-Draft, May 22, 2015, 14 pages.

* cited by examiner

| DEVICE | INGRESS INTERFACE | EGRESS INTERFACE | SOURCE PORT |
|---|---|---|---|
| L11 | N/A | E11/1 | 101, 102, 103, 104, 105, 106, 111, 112, 116 |
| L11 | N/A | E11/2 | 107, 108, 109, 110, 113, 114, 115, 117, 118, 119, 120 |
| S1 | E11/1 | E1/21 | 101, 103, 105, 111, 112, 116 |
| S1 | E11/1 | E1/22 | 102, 104, 106 |
| S2 | E11/2 | E2/21 | 108, 109, 110, 113, 114, 115, 117, 120 |
| S2 | E11/2 | E2/22 | 107, 118, 119 |
| L21 | E1/21 | N/A | 101, 103, 105, 111, 112, 116 |
| L21 | E2/21 | N/A | 108, 109, 110, 113, 114, 115, 117, 120 |
| L22 | E1/22 | N/A | 102, 104, 106 |
| L22 | E2/22 | N/A | 107, 118, 119 |

FIG.3

| PATH | SOURCE PORT |
|---|---|
| L11-S1-L21 | 101, 103, 105, 111, 112, 116 |
| L11-S1-L22 | 102, 104, 106 |
| L11-S2-L21 | 108, 109, 110, 113, 114, 115, 117, 120 |
| L11-S2-L22 | 107, 118, 119 |

FIG.4

EFFICIENT PATH DETECTION AND VALIDATION BETWEEN ENDPOINTS IN LARGE DATACENTERS

TECHNICAL FIELD

The present disclosure relates to data center networking.

BACKGROUND

As data centers embrace virtualization technologies, more and more data center networks are adopting overlay technologies over a CLOS network based architecture, in which Operation and Management (OAM) functions are very important for daily management and performance monitoring. Examples of overlay technologies include Cisco System's Virtual Extensible Local Area Network (VxLAN) and Network Virtualization Overlays (NVO3).

Software-defined networking (SDN) centralizes and simplifies control of network management by allowing network administrators to manage network services through abstraction of higher-level functionality. Such an abstraction and simplification is well aligned with the evolution of the data center network.

BRIEF DESCRIPTION OF THE DRAWINGS

FIG. 3 illustrates data obtained from probe packets received by a software defined networking (SDN) controller as part of a path detection and validation process, according to an example embodiment.

FIG. 4 illustrates the paths computed from the data shown in FIG. 3, for a particular source/destination pair, according to an example embodiment.

DESCRIPTION OF EXAMPLE EMBODIMENTS

Overview

In one embodiment, operations of a method are performed by a network controller for a data center network that comprises a plurality of network devices. The method involves storing information indicating paths between each source/destination pair in the data center network, the paths discovered based on probe packets sent by an ingress network device in the data center network. The information includes source port identifiers of respective source ports associated with each path for each specific source/destination pair. In response to a path monitoring task for a particular source/destination pair, it is determined whether the stored information includes paths for the particular source/destination pair. When it is determined that the stored information includes paths for the particular source/destination pair, a selection is made, from all source ports for the paths, of a subset of source ports that cover all the paths for the particular source/destination pair. The network controller sends to the ingress network device a probe message to cause the ingress network device to send probe packets using the subset of source ports. The network controller receives packets sent by network devices in the data center network based on the probe message received by the ingress switch. The network controller computes paths for the particular source/destination pair based on received probe packets. The network controller determines whether a topology for the data center network has changed by comparing the paths computed based on the receive probe packets for the particular source/destination pair with the paths included in the stored information for the particular source/destination pair.

Example Embodiments

Figure 1:
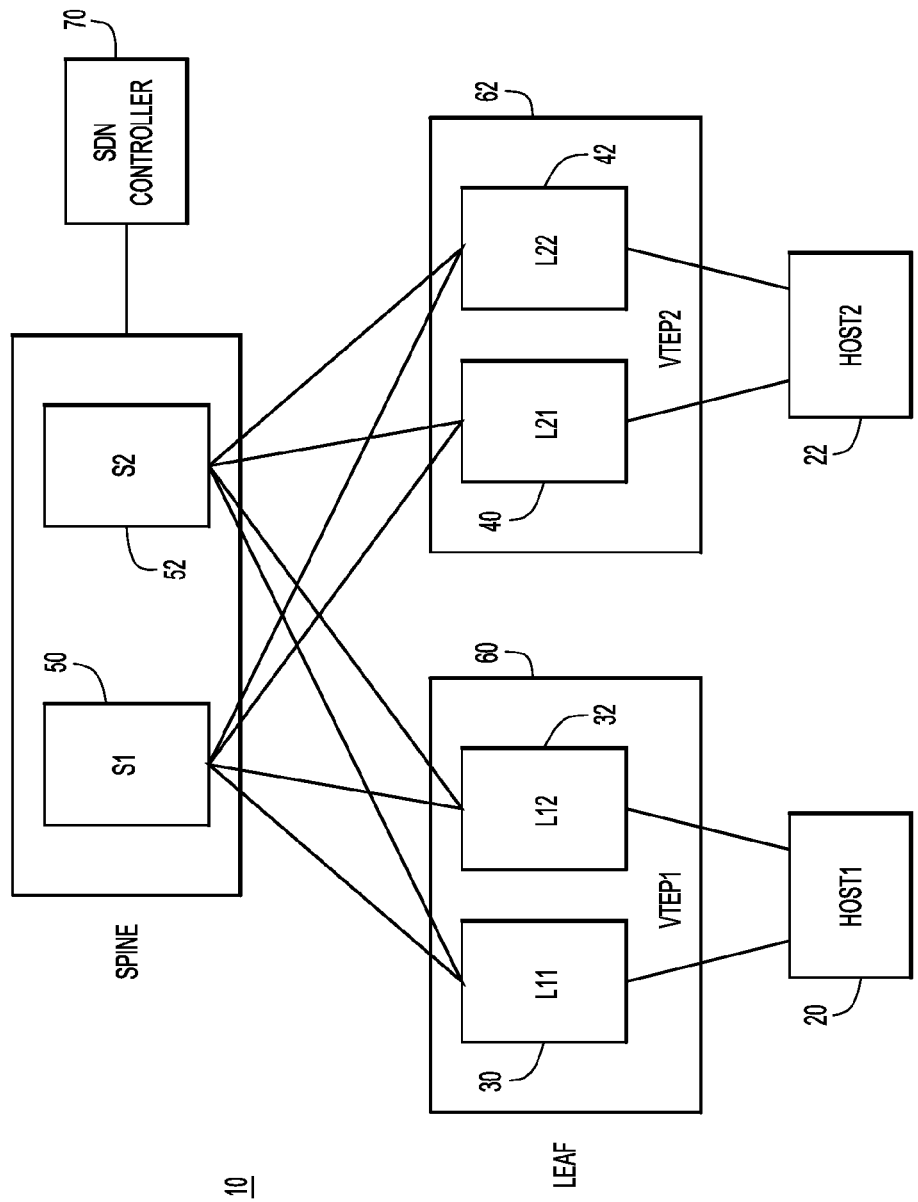
FIG. 1 is block diagram of a data center network configured to perform the path detection and validation techniques presented herein, according to an example embodiment.

Reference is first made to FIG. 1. FIG. 1 illustrates an example of a small size CLOS data center network 10. In this network, each host, Host 1 at reference numeral 20 and Host 2 at reference numeral 22 connects to 2 leaf switches using a link aggregation technology, such as Cisco's virtual port channel (VPC) technology. Specifically, host 20 connects to leaf switches 30 and 32 denoted L11 and L12, respectively, and host 22 connects to leaf switches 40 and 42 denoted L21 and L22, respectively. Each leaf switch 30, 32, 40 and 42 connects to two spine switches S1 at reference numeral 50 and S2 at reference numeral 52.

VxLAN is used to run as the overlay in the network 10, and each pair of leaf switches acts as a logic VxLAN Tunnel End Point (VTEP). For example, leaf switches L11 and L12 act as a single VTEP1, shown at reference numeral 60, for host1, and leaf switches L21 and L22 act as a single VTEP2, shown at reference numeral 60, for host2.

Network overlay technology abstracts out all forwarding details to simplify connectivity and configuration. This allows for more customer flexibility. However, because of all of this flexibility, it is not easy to determine when there are problems occurring in the data center network.

Path detection and health monitoring is a critical component for the data center network OAM. Efforts exist to leverage an SDN controller to achieve these tasks within data center networks. For example, draft-pang-nvo3-vxlan-path-detection proposes an approach to detect paths in overlay networks using an SDN controller. An example of an SDN controller is shown at reference numeral 70 in FIG. 1. The SDN controller 70 is connected to and in communication with all of the leaf and spine switches in the network 10.

Figure 2:
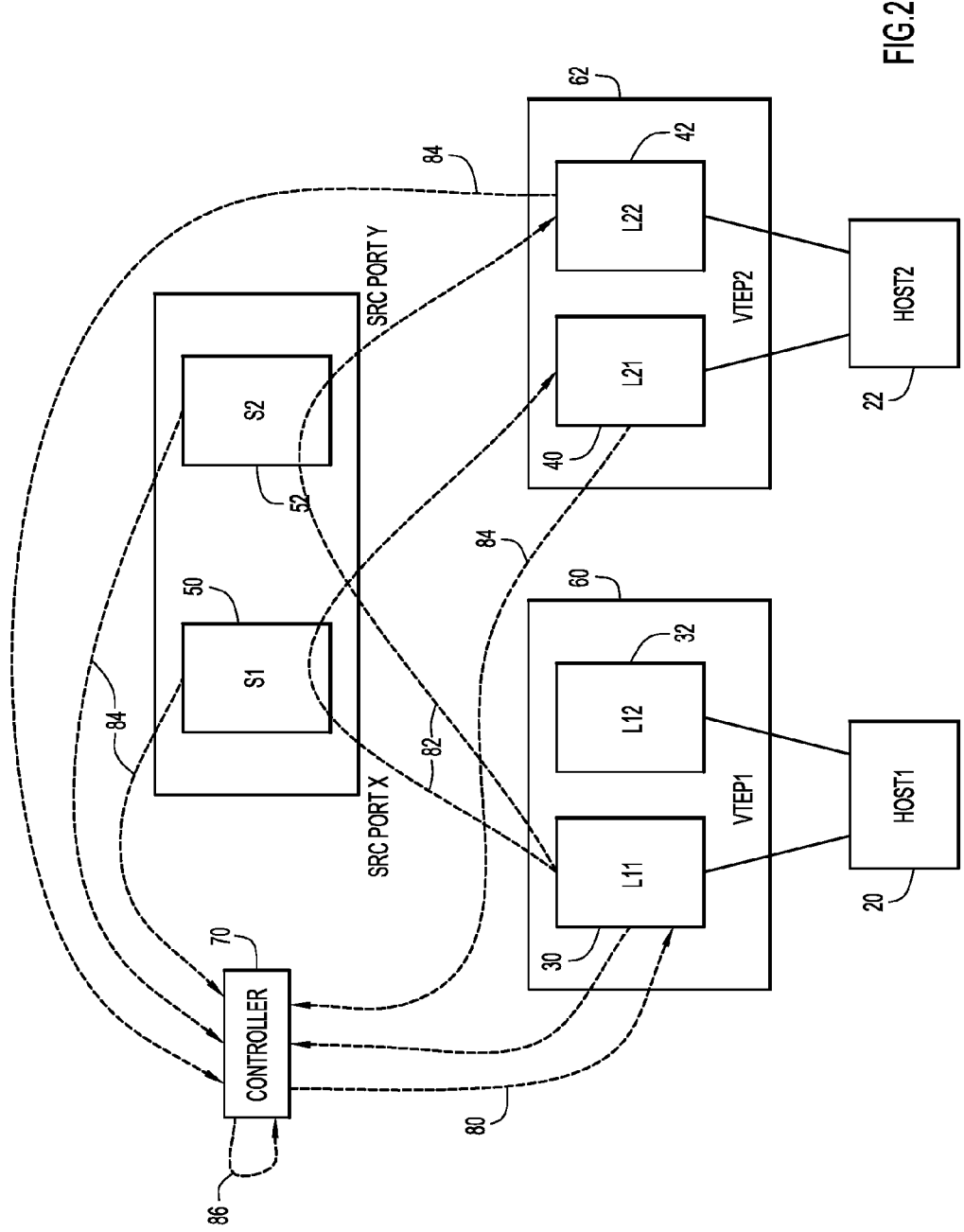
FIG. 2 is a flowchart illustrating a path detection and validation process performed in the data center network of FIG. 1, according to an example embodiment.

Reference is now made to FIG. 2. In an example of a path detection and health monitoring process, at 80, the SDN controller 70 initiates a path detection by sending a probe request with its associated metadata (such as total probe count, probe interval, etc.) to an ingress switch (e.g., switch 30) over a SDN protocol (such as OpenFlow™). At 82, the ingress switch 30 generates the probe packets based on the request. The source port number in each following probe packet is modified incrementally to facilitate the forwarding plane hash computation needed to use parallel paths. In addition, metadata such as task identifier (ID) etc., are embedded in the probe packets.

At 84, as each switch along the forwarding path receives a probe packet, it not only forwards the packet as normal, but also sends the packet to the SDN controller 70, embedded with original and additional metadata (such as ingress interface, egress interface, etc.), through the SDN protocol (e.g. OpenFlow). At 86, as the SDN controller 70 receives probe packets from the devices along the forwarding path, the SDN controller 70 is able to detect and monitor the health of the paths.

As an example, the table in FIG. 3 summarizes the probe packets that the SDN controller 70 receives for a specific path detection task between switch L11 and VTEP2. For example, the SDN controller 70 stores data indicating, for each switch from which it received a probe packet, the ingress interface, egress interface, and source ports associated with the probe packets. Based on these received probe packets, the SDN controller 70 derives that the paths that are existing in the network between switch L11 and VTEP2 are shown in FIG. 4.

Noteworthy in the data of FIG. 4 is that for source/destination pair (L11/VTEP2), there are four paths, and each of the four paths has a plurality of source ports. Thus, it is not necessary to send a probe packet for every source port for each of the four paths. Any of source ports 101, 103, 105, 11, 112 and 116 will cover the path L11-S1-L21; any of the source ports 102, 104 and 106 will cover the path L11-S1-L22; any of source ports 108, 109, 110, 113, 114, 115, 117, and 120 cover the path L11-S2-L21; and any of source ports 107, 118 and 119 cover the path L11-S2-L22.

While current approaches allow network administrators from the centralized SDN controller to schedule and launch OAM operations, collect OAM data, detect end-to-end paths, and analyze the path health, there are scalability challenges in real deployments, as there are a large number of parallel Equal Cost Multiple Paths (ECMPs) existing within a CLOS network.

Consider, as an example, a 2 hop spine/leaf topology, if there are 16 spines, there are 16 paths to reach peer to peer. If the hashing algorithm takes an alternate path every 8th packet, that will require 16*8=128 probe packets. If there are 256 leaf switches then it will generate 256*128 packet=32768 probe packets in the network.

Usually packets are generated every 8 msec, so it takes 5.12 seconds to generate a packet from one leaf. This process is repeated to all leafs with parallelization. To avoid too many control packets in the network it can take several minutes to determine the health status of network. This problems gets complicated even further with a "super spine" topology.

For example, in the CLOS network shown in FIGS. 1 and 2, because there are 4 parallel paths between a pair of VTEPs, in theory, a minimal of 4 probe packets with different source port number need to be generated on L11 to detect all the paths. Specifically, as shown in FIG. 4, as an example, probe packets that are sent from source ports 101, 104, 108 and 118 would cover all four paths. Similarly, probe packets from source ports 103, 104, 109 and 119 would cover all four paths. Between the VTEPs, the only network parameter that varies is the source port. Nevertheless, it is important to generate enough probe traffic to cover all the paths.

In practice, as each switch along the forwarding path runs the ECMP hash computation independently, the ingress switch L11 cannot predicate the exact forwarding path for a specific probe packet. Therefore a much larger number of probe packets (e.g., 20~40 packets, a factor of 5~10) need to be sent to ensure all the possible paths to be monitored. In other words, such an approach is very inefficient.

In a real deployment, the scalability issue is much more severe for several reasons. The number of paths between a pair of VTEPs grows exponentially as more tiers exist between a pair of VTEPs, and more parallel links between tiers. Multiple OAM operations might be scheduled between various VTEP pairs within the same time frame. Periodical path detection tasks might be constantly scheduled to ensure service level agreement (SLA) compliance.

As a result, such an inefficient approach can generate a large number of probe packets and is therefore not scalable. Presented herein are techniques to achieve path detection and health awareness by leveraging SDN controller knowledge.

A process is presented herein to leverage the knowledge of the SDN controller has acquired to optimize the path detection process, based on following characteristic of hash computation on switches: when there is no topology change for a specific packet flow (that is, packets with specific source IP address, destination IP address, protocol, source port, destination port), the hash computation is deterministic. In other words, the packets of the same flow will always be forwarded along the same path. Such a deterministic operation guarantees packets within the flow would arrive in order.

The initial path detection between a specific pair of source/destination is processed as described above. First, the SDN controller initiates the path detection. Next, the ingress switch generates the probe packets, with incremental source port numbers. Then, each switch, upon receiving a probe packet, forwards it as normal, as well as reports it back to the SDN controller. The SDN controller then identifies the paths and their health.

It is desirable to minimize the number of probe packets needed to cover all the paths for path detection and health evaluation. Accordingly, the controller keeps the derived path list and associated source ports in a database as a baseline record for that specific source/destination pair. Later, when another path monitoring task between the same source/destination pair is requested, instead of sending a request to the source switch to generate a large number of probe packets blindly again, the controller intelligently instructs the ingress switch to use a selective subset of source ports, which the controller determines, based on the path list and associated source ports stored in its database, are sufficient to cover all the paths for the specific source/destination pair.

For example, with reference to FIG. 4, in the 2nd request to L11 to monitor all the paths to VTEP2, the controller specifies to use source ports 101, 104, 115, and 119. The selective subset of source port numbers may be varied from time to time to ensure all paths are fairly inspected statistically. For example, in a 3rd request, the source port 111, 102, 110, 118 may be selected. As the controller receives the reported probe packets from the switches, the controller calculates the latest paths, and then compares the latest paths with the baseline record in its database. If they match as expected, the controller concludes that there is no topology change and no further investigation is required. Otherwise, the topology must have changed, and the controller will trigger complete path detection.

Figure 5:
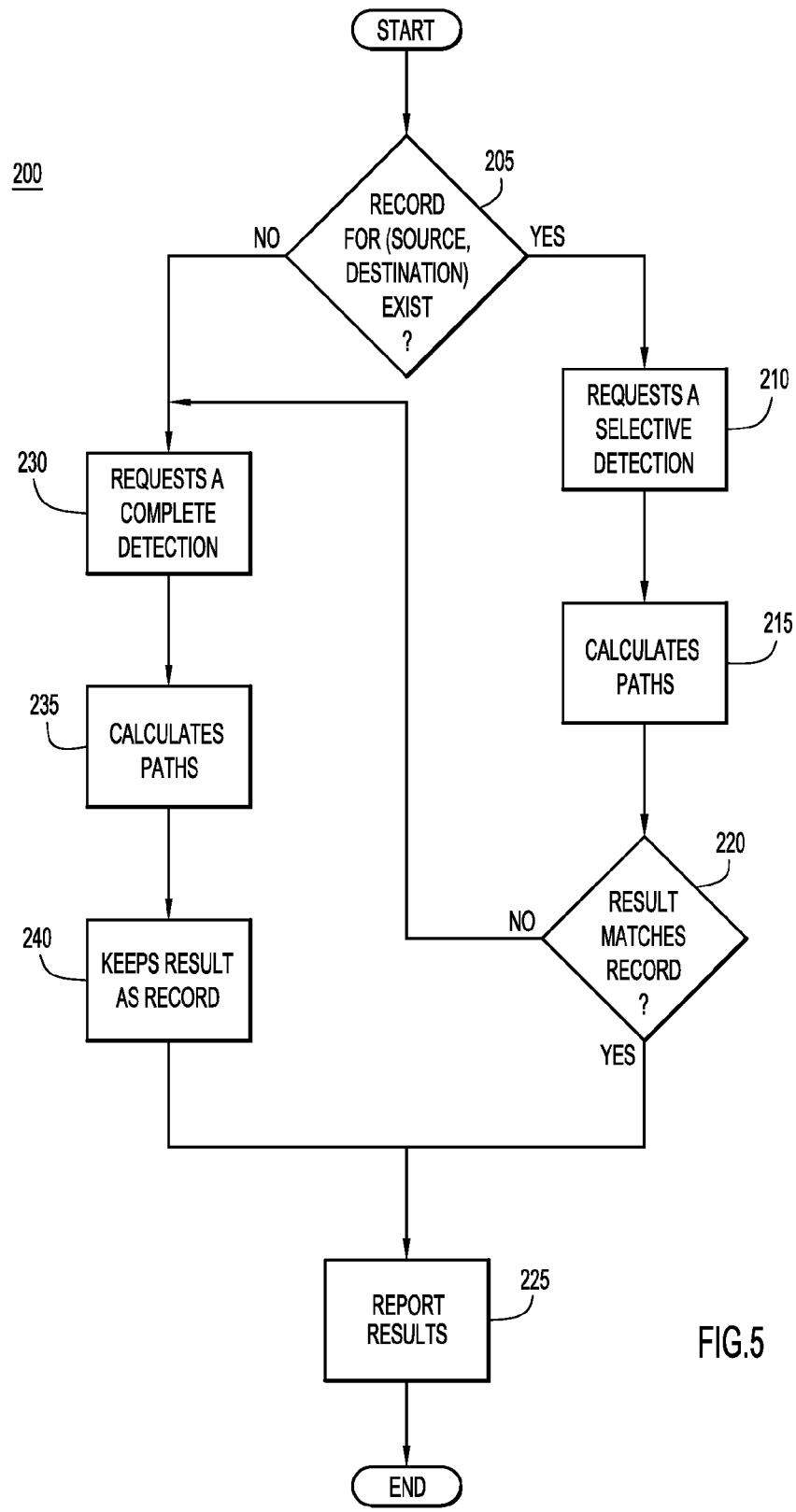
FIG. 5 is a flow chart for a procedure to reduce the amount of probe packets sent as part of the path detection and validation process, according to an example embodiment.

Reference is now made to FIG. 5 for a flow chart that depicts a process 200 performed by the SDN controller in accordance with techniques presented herein. At 205, the controller determines whether a record already exists in its database for a particular source/destination pair. If a record already exists in the database of the controller for the particular source/destination pair, this means that the controller has, in its database, a path list and associate source ports for that source/destination pair. Thus, at 210, the controller can request a selective detection using a selected subset of source ports. Specifically, the controller determines the selected subset of source ports based on the path list and associated source ports for that source/destination pair stored in its database, are sufficient to cover all the paths between that source/destination pair, as described above in connection with FIG. 4. For example, as described above in connection with FIG. 4 for example data center network shown in FIGS. 1 and 2, the controller may select source ports 101, 104, 115, and 119 from which to send probe packets from switch L11. In one embodiment, the controller uses a hashing algorithm that identifies the source ports to be used to cover all paths with one probe packet per path. For example, suppose there are 4 different paths between two endpoints. Using a different source port (all other things like destination port, IP addresses, etc., being invariable) can steer packets to use different paths. The controller can run the values through the hashing algorithm so that it will generate a path: path1: these ports; path2: these other ports, etc. Many algorithms may be used select the subset of source ports.

The controller sends a control message to switch L11 to cause switch L11 to send probe packets from those source ports and each of the switches along the paths will report to the controller, as described above in connection with FIG. 2.

At 215, the controller calculates the paths for the particular source/destination pair using the packets it receives from the switches, as described above in connection with FIG. 2.

Then, at 220, the controller compares the paths computed at 215 based on the packets it receives from the switches with the paths stored for that particular source/destination pair. If the paths match, the controller reports the results at 225, e.g., to a network administrator or other entity. If the computed paths and the stored paths for the particular source/destination pair match as expected, the controller concludes that there is no topology change and no further investigation is required. Otherwise, the topology must have changed, and the controller will trigger complete path detection. Prior to ending the process when a match is determined, the controller may store an indication that it used the specific subset selected at 210 so that the next time a request to monitor that particular source/destination pair is made, the controller can select a different subset of source ports that it has determined will cover all the paths between that source/destination pair.

Thus, when, at 205, it is determined that a record for the particular source/destination pair does not exist in its database, or it the paths compared at 220 do not match, then branch on the left side of FIG. 5 is taken. Specifically, at 230, the controller requests a complete detection, as described above in connection with FIGS. 2 and 3, under which a much larger number of probe packets will be sent because a much larger number of source ports will be used. At 235, the controller computes the paths based on the packets it receives form the complete detection of 230, and at 240, the controller stores the results in a record for that particular source/destination port pair.

Figure 6:
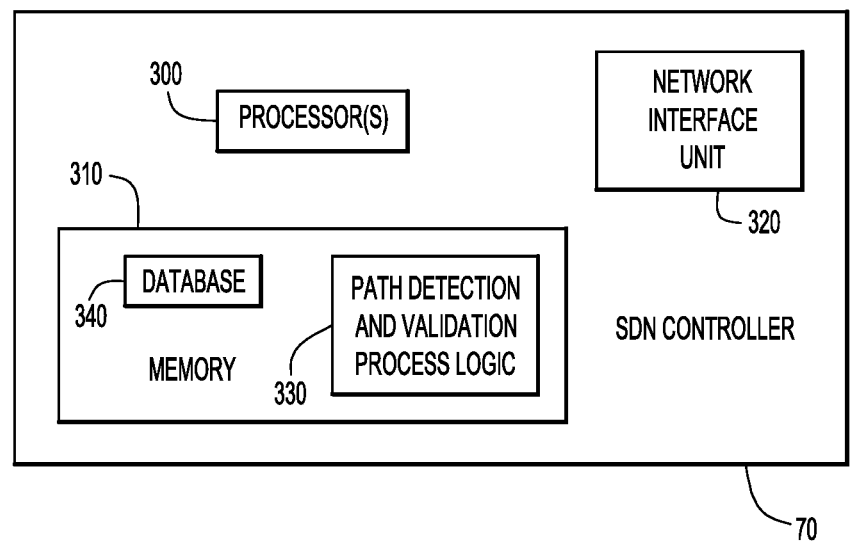
FIG. 6 is a block diagram of an SDN controller, according to an example embodiment.

Reference is now made to FIG. 6, which shows a block diagram of the SDN controller 70. The SDN controller 70 may be embodied in a server computer that includes one or more processors 300, memory 310 and a network interface unit 320. The processor 300 may take the form of a microprocessor or microcontroller. The network interface unit 320 may include one or more network interface cards that enable network communications, in particular, so that the SDN controller 70 can communicate with the switches in a data center network, as described herein. The memory 310 stores instructions for path detection and validation process logic 300 that enables the SDN controller 70 to perform the operations described herein. The memory 310 also stores a database 340 containing paths (computed from running the path detection and validation techniques presented herein) for source/destination pairs in the data center network. An example of a record for a given source/destination pair may contain data similar to that shown in FIG. 4, described above. As described above, the SDN controller 70 populates (and updates) the database with this path related information based on probe packets it receives during a path detection and validation procedure.

The memory 310 may include read only memory (ROM), random access memory (RAM), magnetic disk storage media devices, optical storage media devices, flash memory devices, electrical, optical, or other physical/tangible memory storage devices. Thus, in general, the memory 310 may comprise one or more tangible (non-transitory) computer readable storage media (e.g., a memory device) encoded with software comprising computer executable instructions and when the software is executed (by the processor(s) 300), the processor(s) 300 is operable to perform the operations described herein.

Figure 7:
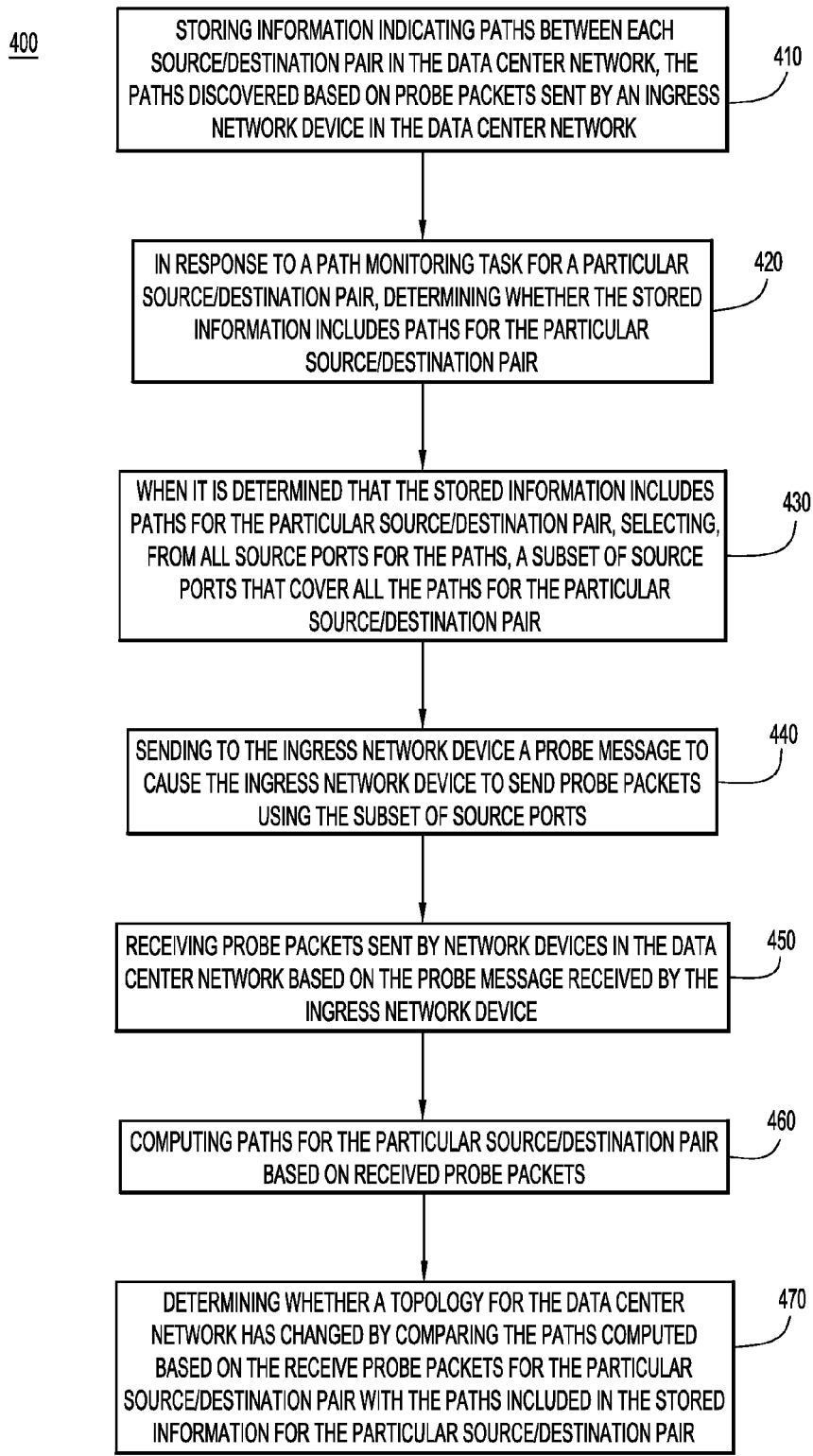
FIG. 7 is high-level flow chart depicting a process performed by the SDN controller according to an example embodiment.

Reference is now made to FIG. 7, which illustrates steps of operations of a process 400 performed by an SDN controller, e.g., SDN controller 70 shown in FIGS. 1 and 2, in accordance with embodiments presented herein. As described above, the SDN controller is a network controller for a data center network that comprises a plurality of network devices. In one example, the network devices are leaf switches and spine switches connected in a CLOS-based architecture. Furthermore, respective hosts may be connected to a respective pair of leaf switches using link aggregation, e.g., virtual port channel technology.

At 410, the SDN controller 70 stores information indicating paths between each source/destination pair in the data center network. The paths are discovered based on probe packets sent by an ingress network device in the data center network. The information may include source port identifiers of respective source ports associated with each path for each specific source/destination pair. Thus, operation 410 pertains to the SDN controller populating (and updating) a database of paths for source/destination pairs in the data center network. A source/destination pair may be a in terms of a particular network device to a particular host, a particular network device to a particular VTEP, a particular network device to another particular network device, etc.

At 420, when a path monitoring task is to be performed for a particular source/destination pair, the SDN controller determines whether the stored information (populated and updated via operation 410) includes paths for the particular source/destination pair. That is, the SDN controller examines the data stored in its database to determine whether there is a record for the particular source/destination pair.

At 430, when the SDN controller determines that the stored information includes paths for the particular source/destination pair, that is, there is a record in the database for the particular source/destination pair, the SDN controller selects, from all source ports for the paths, a subset of source ports that cover all the paths for the particular source/destination pair. In other words, the SDN controller looks at the source ports stored in the database for all paths for the particular source/destination pair, and selects only a subset of the source ports that covers all of the paths for that particular source/destination pair. This is described above in connection with the example of FIG. 4. The goal is that, within the selected subset of source ports, each source port will cover a distinct path, such that for the entire subset, all the paths are covered between the source/destination pair.

At 440, the SDN controller sends to the ingress network device in the data center network a probe message to cause the ingress network device to send probe packets using the subset of source ports.

At 450, the SDN controller receives probe packets sent by network devices in the data center network based on the probe message received by the ingress switch. The SDN controller can determine information indicating that paths that the probe packets travel in the network. An example of the data that the SDN controller obtains from received probe packets is shown in FIG. 4. At 460, the SDN controller computes paths for the particular source/destination pair based on received probe packets.

At 470, the SDN controller determines whether a topology for the data center network has changed by comparing the paths computed based on the receive probe packets for the particular source/destination pair with the paths included in the stored information for the particular source/destination pair. In particular, the SDN controller will determine, at 470, that the topology has not changed when the comparing reveals that the paths computed based on the receive probe packets for the particular source/destination pair match the paths included in the stored information for the particular source/destination pair. Otherwise, the SDN controller will determine that the topology has changed when the comparing reveals that the paths computed based on the receive probe packets for the particular source/destination pair do not match the paths included in the stored information for the particular source/destination pair.

As described above, when a subset of source ports is selected at step 430, an indication of that subset of source ports (for that particular source/destination pair) is stored by the controller so that at a subsequent path monitoring task for the particular source/destination pair, the controller can selecting a different subset of source ports that that cover all the paths for the particular source/destination pair. Thereafter, operations 440, 450, 460 and 470 are performed to determine whether a topology for the data center network has changed based on probe packets sent the different subset of source ports.

When, at 470, it is determined that the topology has changed, the SDN controller sends to the ingress network device a probe message that causes the ingress network device to use source ports with incrementally increasing source port numbers when sending probe packets in accordance with a complete path detection process for the particular source/destination pair. This is the path detection process that generates a much larger number of probe packets than what is generated by the subset of source ports by step 430. The SDN controller will compute paths for the particular source/destination pair based on probe packets received from network devices in the data center network in accordance with the complete path detection process for the particular source/destination pair.

In summary, presented herein are techniques to efficiently and quickly monitor all the paths in data center network, particularly in very large scale data center networks. The number of paths can be very large, but network administrators still want to proactively monitor all the paths. The efficient algorithm presented herein reduces the number of packets needed to be sent in the network and yet still covers all the paths. The SDN controller learns about the ECMP hash and packet distribution and can readjust to efficiently cover all the ECMP paths throughout the network.

In one form, a method is provided that is performed by a network controller for a data center network that comprises a plurality of network devices, the method comprising: storing information indicating paths between each source/destination pair in the data center network, the paths discovered based on probe packets sent by an ingress network device in the data center network, the information including source port identifiers of respective source ports associated with each path for each specific source/destination pair; in response to a path monitoring task for a particular source/destination pair, determining whether the stored information includes paths for the particular source/destination pair; when it is determined that the stored information includes paths for the particular source/destination pair, selecting, from all source ports for the paths, a subset of source ports that cover all the paths for the particular source/destination pair; sending to the ingress network device a probe message to cause the ingress network device to send probe packets using the subset of source ports; receiving probe packets sent by switches in the data center network based on the probe message received by the ingress network device; computing paths for the particular source/destination pair based on received probe packets; and determining whether a topology for the data center network has changed by comparing the paths computed based on the receive probe packets for the particular source/destination pair with the paths included in the stored information for the particular source/destination pair.

In another form, an apparatus is provided comprising: a network interface unit configured to enable communications in a data center network with a plurality of network devices; a memory; a processor coupled to the network interface unit and to the memory, the processor configured to: store in the memory information indicating paths between each source/destination pair in the data center network, the paths discovered based on probe packets sent by an ingress network device in the data center network, the information including source port identifiers of respective source ports associated with each path for each specific source/destination pair; in response to a path monitoring task for a particular source/destination pair, determine whether the stored information includes paths for the particular source/destination pair; when it is determined that the stored information includes paths for the particular source/destination pair, select, from all source ports for the paths, a subset of source ports that cover all the paths for the particular source/destination pair; send, via the network interface unit, to the ingress network device a probe message to cause the ingress network device to send probe packets using the subset of source ports; receive, via the network interface unit, probe packets sent by network device in the data center network based on the probe message received by the ingress network device; compute paths for the particular source/destination pair based on received probe packets; and determine whether a topology for the data center network has changed by comparing the paths computed based on the receive probe packets for the particular source/destination pair with the paths included in the stored information for the particular source/destination pair.

In still another form, one or more non-transitory computer readable storage media encoded with instructions that, when executed by a processor in a network controller for a data center network that comprises a plurality of network devices, cause the processor to perform operations comprising: storing information indicating paths between each source/destination pair in the data center network, the paths discovered based on probe packets sent by an ingress network device in the data center network, the information including source port identifiers of respective source ports associated with each path for each specific source/destination pair; in response to a path monitoring task for a particular source/destination pair, determining whether the stored information includes paths for the particular source/destination pair; when it is determined that the stored information includes paths for the particular source/destination pair, selecting, from all source ports for the paths, a subset of source ports that cover all the paths for the particular source/destination pair; sending to the ingress network device a probe message to cause the ingress network device to send probe packets using the subset of source ports; receiving probe packets sent by network device in the data center network based on the probe message received by the ingress network device; computing paths for the particular source/destination pair based on received probe packets; and determining whether a topology for the data center network has changed by comparing the paths computed based on the receive probe packets for the particular source/destination pair with the paths included in the stored information for the particular source/destination pair.

In certain example implementations, the functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor or other similar machine, instructions in software, hardware, firmware, or any combination thereof, etc.). This tangible media may be non-transitory in at least one embodiment. In some of these instances, one or more memory elements (as shown in FIG. 7) can store data used for the operations described herein. This includes the memory elements being able to store software, logic, code, and/or processor instructions that are executed to carry out the activities described herein. A processor can execute any type of instructions associated with the data to achieve the operations detailed herein. In one example, a processor (as shown in FIG. 7) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In the examples provided herein, interaction may be described in terms of two, three, or more network elements (e.g., switches and the SDN controller). However, this has been done for purposes of clarity and example only. In certain cases, it may be easier to describe one or more of the functionalities of a given set of flows by only referencing a limited number of elements. It should be appreciated that the operations presented herein are readily scalable and can accommodate a large number of elements, as well as more complicated/sophisticated arrangements and configurations. Accordingly, the examples provided should not limit the scope or inhibit the broad teachings as potentially applied to a myriad of other architectures or implementations.

The activities, interactions, and operations in the preceding flow diagrams illustrate only some of the possible partial replication scenarios and patterns that may be executed by, or within, embodiments of a system for partially replication endpoint routing information. Some of these activities, interactions, and/or operations may be deleted or removed where appropriate, or may be modified, divided, or changed considerably without departing from the scope of the present disclosure. In addition, a number of these activities, interactions, and/or operations have been described as being executed before, after, concurrently with, or in parallel to, one or more additional activities, interactions, and/or operations. However, the timing of these activities, interactions, and/or operations may be altered considerably. The preceding operational flows have been offered for purposes of example and discussion. Substantial flexibility is provided in that any suitable arrangements, chronologies, configurations, and timing mechanisms may be provided without departing from the teachings of the present disclosure.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method performed by a network controller for a data center network that comprises a plurality of network devices, the method comprising:

storing information indicating paths between each source/destination pair in the data center network, the paths discovered based on probe packets sent by an ingress network device in the data center network, the information including source port identifiers of respective logical source ports associated with each path for each specific source/destination pair;

in response to a path monitoring task for a particular source/destination pair, determining whether the stored information includes paths for the particular source/destination pair;

when it is determined that the stored information includes paths for the particular source/destination pair, selecting, for each specific path of the paths included in the stored information for the particular source/destination pair, a logical source port from all logical source ports for the specific path, so as to select a subset of different logical source ports that cover all the paths for the particular source/destination pair, wherein all logical source ports for at least one specific path is a plurality of logical source ports;

sending to the ingress network device a probe message to cause the ingress network device to send a plurality of probe packets using the selected subset of different logical source ports such that each probe packet includes a corresponding one of the different logical source ports;

receiving probe packets sent by switches in the data center network based on the probe message received by the ingress network device;

computing paths for the particular source/destination pair based on the received probe packets; and determining whether a topology for the data center network has changed by comparing the paths computed based on the received probe packets for the particular source/destination pair with the paths included in the stored information for the particular source/destination pair.

2. The method of claim 1, wherein determining whether the topology for the data center network has changed comprises determining that the topology has not changed when the comparing reveals that the paths computed based on the received probe packets for the particular source/destination pair match the paths included in the stored information for the particular source/destination pair, and otherwise determining that the topology has changed when the comparing reveals that the paths computed based on the received probe packets for the particular source/destination pair do not match the paths included in the stored information for the particular source/destination pair.

3. The method of claim 1, wherein selecting comprises selecting the subset of different logical source ports such that each logical source port in the subset will cover a distinct path for the source/destination pair.

4. The method of claim 1, further comprising:
storing an indication of the subset of different logical source ports; and
at a subsequent path monitoring task for the particular source/destination pair, the selecting comprises selecting a different subset of different logical source ports that cover all the paths for the particular source/destination pair.

5. The method of claim 4, wherein the sending, receiving, computing and determining whether a topology for the data center network has changed are performed based on probe packets sent using the different subset of different logical source ports.

6. The method of claim 1, wherein when it is determined that the topology has changed, further comprising sending to the ingress network device a probe message that causes the ingress network device to use logical source ports with incrementally increasing source port numbers when sending probe packets in accordance with a complete path detection process for the particular source/destination pair.

7. The method of claim 6, further comprising computing paths for the particular source/destination pair based on probe packets received from network devices in the data center network in accordance with the complete path detection process for the particular source/destination pair.

8. The method of claim 1, wherein pairs of leaf network devices that are connected to a host using link aggregation form a virtual tunneling endpoint configured to operate in accordance with a virtualization overlay technology.

9. An apparatus comprising:
a network interface unit configured to enable communications in a data center network with a plurality of network devices;
a memory;
a processor coupled to the network interface unit and to the memory, the processor configured to:
store in the memory information indicating paths between each source/destination pair in the data center network, the paths discovered based on probe packets sent by an ingress network device in the data center network, the information including source port identifiers of respective logical source ports associated with each path for each specific source/destination pair;
in response to a path monitoring task for a particular source/destination pair, determine whether the stored information includes paths for the particular source/destination pair;
when it is determined that the stored information includes paths for the particular source/destination pair, select, for each specific path of the paths included in the stored information for the particular source/destination pair, a logical source port from all logical source ports for the specific path, so as to select a subset of different logical source ports that cover all the paths for the particular source/destination pair, wherein all logical source ports for at least one specific path is a plurality of logical source ports;
send, via the network interface unit, to the ingress network device a probe message to cause the ingress network device to send a plurality of probe packets using the selected subset of different logical source ports such that each probe packet includes a corresponding one of the different logical source ports;
receive, via the network interface unit, probe packets sent by network device in the data center network based on the probe message received by the ingress network device;
compute paths for the particular source/destination pair based on the received probe packets; and
determine whether a topology for the data center network has changed by comparing the paths computed based on the received probe packets for the particular source/destination pair with the paths included in the stored information for the particular source/destination pair.

10. The apparatus of claim 9, wherein the processor is configured to determine that the topology has not changed when the paths computed based on the received probe packets for the particular source/destination pair match the paths included in the stored information for the particular source/destination pair, and otherwise determine that the topology has changed when the paths computed based on the received probe packets for the particular source/destination pair do not match the paths included in the stored information for the particular source/destination pair.

11. The apparatus of claim 9, wherein the processor is configured to select the subset of different logical source ports such that each logical source port in the subset will cover a distinct path for the source/destination pair.

12. The apparatus of claim 9, wherein the processor is further configured to:
store in the memory an indication of the subset of different logical source ports; and
at a subsequent path monitoring task for the particular source/destination pair, select a different subset of different logical source ports that cover all the paths for the particular source/destination pair.

13. The apparatus of claim 10, wherein the processor is configured to perform the send, receive, compute and determine whether a topology for the data center network has changed operations based on probe packets sent using the different subset of different logical source ports.

14. The apparatus of claim 10, wherein the processor is configured to, when it is determined that the topology has changed, send to the ingress network device a probe message that causes the ingress network device to use logical source ports with incrementally increasing source port numbers when sending probe packets in accordance with a complete path detection process for the particular source/destination pair.

15. The apparatus of claim 10, wherein the processor is configured to compute paths for the particular source/destination pair based on probe packets received from network devices in the data center network in accordance with the complete path detection process for the particular source/destination pair.

16. One or more non-transitory computer readable storage media encoded with instructions that, when executed by a processor in a network controller for a data center network that comprises a plurality of network devices, cause the processor to perform operations comprising:
storing information indicating paths between each source/destination pair in the data center network, the paths discovered based on probe packets sent by an ingress network device in the data center network, the information including source port identifiers of respective logical source ports associated with each path for each specific source/destination pair;
in response to a path monitoring task for a particular source/destination pair, determining whether the stored information includes paths for the particular source/destination pair;
when it is determined that the stored information includes paths for the particular source/destination pair, selecting, for each specific path of the paths included in the stored information for the particular source/destination pair, a logical source port from all logical source ports for the specific path, so as to select a subset of different logical source ports that cover all the paths for the particular source/destination pair, wherein all logical source ports for at least one specific path is a plurality of logical source ports;
sending to the ingress network device a probe message to cause the ingress network device to send a plurality of probe packets using the selected subset of different logical source ports such that each probe packet includes a corresponding one of the different logical source ports;
receiving probe packets sent by network device in the data center network based on the probe message received by the ingress network device;
computing paths for the particular source/destination pair based on the received probe packets; and
determining whether a topology for the data center network has changed by comparing the paths computed based on the received probe packets for the particular source/destination pair with the paths included in the stored information for the particular source/destination pair.

17. The non-transitory computer readable storage media of claim 16, wherein the instructions for wherein determining whether the topology for the data center network has changed comprise instructions for determining that the topology has not changed when the comparing reveals that the paths computed based on the received probe packets for the particular source/destination pair match the paths included in the stored information for the particular source/destination pair, and otherwise determining that the topology has changed when the comparing reveals that the paths computed based on the received probe packets for the particular source/destination pair do not match the paths included in the stored information for the particular source/destination pair.

18. The non-transitory computer readable storage media of claim 16, wherein when it is determined that the topology has changed, further comprising instructions for:
sending to the ingress network device a probe message that causes the ingress network device to use logical source ports with incremental source port numbers when sending probe packets in accordance with a complete path detection process for the particular source/destination pair; and
computing paths for the particular source/destination pair based on probe packets received from network devices in the data center network in accordance with the complete path detection process for the particular source/destination pair.

19. The non-transitory computer readable storage media of claim 16, further comprising instructions for:
storing an indication of the subset of different logical source ports; and
at a subsequent path monitoring task for the particular source/destination pair, the selecting comprises selecting a different subset of different logical source ports that cover all the paths for the particular source/destination pair.

20. The non-transitory computer readable storage media of claim 19, wherein the instructions for sending, receiving, computing and determining whether a topology for the data center network has changed is performed based on probe packets sent using the different subset of different logical source ports.

* * * * *